US012687706B2

(12) United States Patent
Zhu

(10) Patent No.: US 12,687,706 B2
(45) Date of Patent: Jul. 21, 2026

(54) CAMERA OPTICAL LENS

(71) Applicant: Changzhou AAC Raytech Optronics Co., Ltd., Changzhou City (CN)

(72) Inventor: Feng Zhu, Changzhou (CN)

(73) Assignee: Changzhou AAC Raytech Optronics Co., Ltd., Changzhou City (CN)

( * ) Notice: Subject to any disclaimer, the term of this patent is extended or adjusted under 35 U.S.C. 154(b) by 244 days.

(21) Appl. No.: 18/748,047

(22) Filed: Jun. 19, 2024

(65) Prior Publication Data

US 2025/0298218 A1 Sep. 25, 2025

Related U.S. Application Data

(63) Continuation of application No. PCT/CN2024/082979, filed on Mar. 21, 2024.

(51) Int. Cl.
*G02B 13/00* (2006.01)
*G02B 9/62* (2006.01)

(52) U.S. Cl.
CPC ............. *G02B 13/007* (2013.01); *G02B 9/62* (2013.01); *G02B 13/0045* (2013.01)

(58) Field of Classification Search
CPC ..... G02B 13/007; G02B 9/62; G02B 13/0045
USPC .................................................. 359/733, 757
See application file for complete search history.

(56) References Cited

U.S. PATENT DOCUMENTS

2025/0138285 A1* 5/2025 Li ...................... G02B 13/0045

FOREIGN PATENT DOCUMENTS

CN 115437128 A * 12/2022 ........... G02B 13/007
CN 115793190 A * 3/2023
WO WO-2025059877 A1 * 3/2025 ............. G03B 17/17

* cited by examiner

*Primary Examiner* — George G. King
(74) *Attorney, Agent, or Firm* — Wiersch Law Group

(57) ABSTRACT

Disclosed is a camera optical lens, including a first optical member having a positive refractive force, a second lens having a negative refractive force, a third lens having a positive refractive force, a fourth lens having a negative refractive force, a fifth lens having a positive refractive force, and a sixth lens. An objective surface of the first optical member is curved, and an image surface of the first optical member is curved. The first optical member is provided with a reflective surface. A radius of curvature of the image surface of the first optical member is R2; an Abbe number of the first optical member is vd1, and a radius of curvature of the objective surface of the second lens is R3, and the following relationship expressions are satisfied: vd1≥60.00; 4.50≤R2/R3≤50.00. The camera optical lens can improve an aspherical prismatic lens, thereby realizing a large-aperture periscope-style design.

14 Claims, 6 Drawing Sheets

10

CAMERA OPTICAL LENS

CROSS-REFERENCE TO RELATED APPLICATIONS

This application is a continuation of International Application No. PCT/CN2024/082979, filed on Mar. 21, 2024, the entire contents of which are incorporated herein by reference.

TECHNICAL FIELD

The present application relates to the technical field of optical lenses, in particular to a camera optical lens.

BACKGROUND

With the rapid development and popularization of smartphones, the research, development, and design of camera modules have also advanced rapidly. Coupled with the current trend in electronic products towards compact and lightweight designs with excellent functionality, small-sized camera modules with good imaging quality have become the mainstream in the market.

Telephoto camera modules fulfill the specific needs of consumers for capturing distant objects. However, traditional telephoto camera modules have an optical length that is too large, which does not meet the requirements for slim design in smartphones. In contrast, periscope-style telephoto camera module designs significantly reduce the optical length while still meeting the requirements for telephoto design. Nevertheless, the optical performance of existing periscope-style telephoto camera modules still fails to meet the demands.

SUMMARY

An object of an embodiment of the present application is to provide a camera optical lens capable of realizing a large aperture periscope design with good optical performance.

In order to solve the above technical problem, a first aspect of the present application provides a camera optical lens, comprising in order from an objective side to an image side: a first optical member having a positive refractive force; a second lens having a negative refractive force; a third lens having a positive refractive force; a fourth lens having a negative refractive force; a fifth lens having a positive refractive force; and a sixth lens; wherein an objective surface of the first optical member is curved and convex at a proximal-axis position, and an image surface of the first optical member is curved and concave at a proximal-axis position; the first optical member is provided with a reflective surface between an objective surface and an image surface; a radius of curvature of the image surface of the first optical member is R2; an Abbe number of the first optical member is vd1, and a radius of curvature of an objective surface of the second lens is R3, and the following relationship expressions are satisfied:

$$vd1 \geq 60.00;$$

$$4.50 \leq R2/R3 \leq 50.00.$$

In an embodiment, an on-axis thickness of the second lens is d5; a focal length of the second lens is f2, and the following relationship expression is satisfied:

$$-12.00 \leq f2/d5 \leq -10.00.$$

In an embodiment, an on-axis thickness of the fourth lens is d9; an on-axis spacing between the fourth lens and the fifth lens is d10, and the following relationship expression is satisfied:

$$0.95 \leq d9/d10 \leq 3.10.$$

In an embodiment, a radius of curvature of an objective surface of the fourth lens is R7; a radius of curvature of an image surface of the fourth lens is R8, and the following relationship expression is satisfied:

$$-5.70 \leq R7/R8 \leq -1.60.$$

In an embodiment, a focal length of the camera optical lens is f; a maximum image height of the camera optical lens is IH, and the following relationship expression is satisfied:

$$f/IH \leq 4.50.$$

In an embodiment, a focal length of the first optical member is f1; a focal length of the camera optical lens is f; a radius of curvature of the objective surface of the first optical member is R1; an on-axis thickness from the objective surface of the first optical member to the reflective surface is d1; a total track length of the camera optical lens is TTL, and the following relationship expressions are satisfied:

$$1.83 \leq f1/f \leq 8.63;$$

$$-22.32 \leq (R1 + R2)/(R1 - R2) \leq 2.86;$$

$$0.08 \leq d1/TTL \leq 0.27.$$

In an embodiment, an objective surface of the second lens is convex at a proximal-axis position, and an image surface of the second lens is concave at a proximal-axis position; a radius of curvature of the image surface of the second lens is R4; a focal length of the second lens is f2; an on-axis thickness of the second lens is d5; a total track length of the camera optical lens is TTL, and the following relationship expressions are satisfied:

$$-1.83 \leq (R3 + R4)/(R3 - R4) \leq 6.10;$$

$$-1.65 \leq f2/f \leq -0.49;$$

$$0.02 \leq d5/TTL \leq 0.07.$$

3

In an embodiment, an objective surface of the third lens is convex at a proximal-axis position, and an image surface of the third lens is convex at a proximal-axis position; a radius of curvature of the objective surface of the third lens is R5, and a radius of curvature of the image surface of the third lens is R6; a focal length of the third lens is f3; an on-axis thickness of the third lens is d7; a total track length of the camera optical lens is TTL, and the following relationship expressions are satisfied:

$$-1.51 \le (R5 + R6)/(R5 - R6) \le -0.49;$$

$$0.15 \le f3/f \le 0.50;$$

$$0.04 \le d7/TTL \le 0.14.$$

In an embodiment, an objective surface of the fourth lens is concave at a proximal-axis position, and an image surface of the fourth lens is concave at a proximal-axis position; a radius of curvature of the objective surface of the fourth lens is R7, and a radius of curvature of the image surface of the fourth lens is R8; a focal length of the fourth lens is f4; an on-axis thickness of the fourth lens is d9; a total track length of the camera optical lens is TTL, and the following relationship expressions are satisfied:

$$-1.02 \le f4/f \le -0.24;$$

$$0.02 \le d9/TTL \le 0.08.$$

In an embodiment, an objective surface of the fifth lens is convex at a proximal-axis position, and an image surface of the fifth lens is concave at a proximal-axis position; a radius of curvature of the objective surface of the fifth lens is R9, and a radius of curvature of the image surface of the fifth lens is R10; a focal length of the fifth lens is f5; an on-axis thickness of the fifth lens is d11; a total track length of the camera optical lens is TTL:

$$-5.45 \le (R9 + R10)/(R9 - R10) \le -1.30;$$

$$0.32 \le f5/f \le 1.16;$$

$$0.02 \le d11/TTL \le 0.10.$$

In an embodiment, a radius of curvature of the objective surface of the sixth lens is R11, and a radius of curvature of the image surface of the sixth lens is R12; a focal length of the sixth lens is f6; an on-axis thickness of the sixth lens is d13; and a total track length of the camera optical lens is TTL:

$$-208.82 \le (R11 + R12)/(R11 - R12) \le 17.08;$$

$$-8.06 \le f6/f \le 6.55;$$

$$0.01 \le d13/TTL \le 0.04.$$

The beneficial effect of the present invention lies in the use of an aspherical prism design for the first optical element, which improves the optical performance of the camera lens even when the aspherical prism is tilted, enabling image stabilization. Additionally, the setting of the Abbe number of aspherical prism and the shapes of the objective surface and image surface of the aspherical prism enables a large-aperture periscope-style design, ensuring excellent optical performance.

BRIEF DESCRIPTION OF THE DRAWINGS

In order to more clearly illustrate the technical solutions in the embodiments of the present application, the accompanying drawings to be used in the description of the embodiments will be briefly introduced in the following. Obviously, the accompanying drawings in the following description are only some of the embodiments of the present application. For people of ordinary skill in the field, other accompanying drawings can be obtained according to these drawings without putting forth any creative labor.

DETAILED DESCRIPTION OF THE EMBODIMENTS

Figure 1:
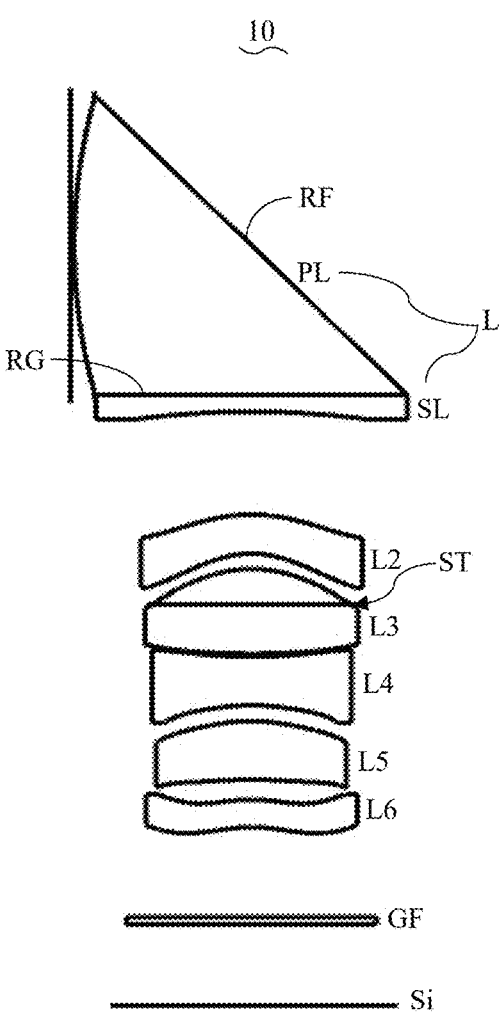
FIG. 1 is a structural schematic diagram of a camera optical lens according to the first embodiment of the present application.

In order to make the objects, technical solutions, and advantages of the embodiments of the present application clearer, various embodiments of the present application will be described in detail below in conjunction with the accompanying drawings. However, it can be understood by those of ordinary skill in the art that in the various embodiments of the present application, a number of technical details are proposed in order to enable the reader to better understand the present application. However, even without these technical details and various variations and modifications based on the following various embodiments, the technical solution claimed to be protected by the present application can be realized.

As shown in the accompanying drawings, a technical solution of the present application provides a camera optical lens 10, 20, 30, including in order from an objective side to an image side: a first optical member L1 having a positive refractive force, a second lens L2 having a negative refractive force, an aperture ST, a third lens L3 having a positive refractive force, a fourth lens L4 having a negative refractive force, a fifth lens L5 having a positive refractive force, and a sixth lens L6. An objective surface of the first optical member L1 is curved and convex at a proximal-axis portion. An image surface of the first optical member L1 is curved and concave at a proximal-axis portion. The first optical member is provided with a reflective surface between the objective surface and the image surface. A radius of curvature of the image surface of the first optical member L1 is R2. An Abbe number of the first optical member L1 is vd1. A radius of curvature of the objective surface of the second lens L2 is R3, and the following relationship expressions are satisfied:

$$vd1 \geq 60.00; \tag{1}$$

$$4.50 \leq R2/R3 \leq 50.00. \tag{2}$$

The first optical member L1 is formed by gluing a first prism PL and a first lens SL. The first lens SL is closer to the image surface than the first prism PL. The objective surface of the first prism PL is the objective surface of the first optical member L1, and the image surface of the first lens SL is the image surface of the first optical member L1. The gluing surface RG is perpendicular to an optical axis of the camera optical lens 10, 20, 30 and provided close to the image surface of the first optical member L1. The first optical member L1 may also be an integrally molded structure, i.e. the first prism PL and the first lens PL are integrally molded. The objective surface of the first prism PL is aspherical. In an embodiment, the image surface of the first prism PL is a standard surface, and the objective surface of the first lens SL is also a standard surface, so as to be able to reduce the difficulty of gluing the first prism PL and first lens SL. In an embodiment, the image surface of the first lens SL may be spherical or aspherical.

Above, the first optical member L1 is set as a combination of the first prism PL and the first lens SL to realize Optical Image Stabilizer (OIS) optical stabilization when the first prism PL is rotated and/or tilted in a direction perpendicular to the optical axis, i.e., the aspherical surface of the first prism PL and the spherical/aspherical surface of the first lens SL can be designed to improve the optical performance of the first prism PL after tilting.

The objective surface of the first optical member L1 is convex at a proximal-axis position and the image surface is concave at a proximal-axis position. In this way, the optical stabilization of the camera optical lens 10 can be achieved when the first optical member L1 is rotated and/or tilted in a direction perpendicular to the optical axis, and this facet design and assignment improves the optical performance of the aspherical prism PL after tilting.

The relationship expression (1) specifies the Abbe number vd1 of the first optical member L1, which helps to reduce the dispersion and improve the optical flux. It is noted that when the first optical member L1 is formed by gluing the first prism PL and the first lens SL, the first prism PL and the first lens SL are made of the same material.

The relationship expression (2) specifies a range of a ratio of the radius of curvature R2 of the image surface of the first optical member L1 to the radius of curvature R3 of the objective surface of the second lens, and the shapes of the image surface of the first optical member L1 and the objective surface of the second lens L2 are controlled, which contributes to a smoothness of the propagation of the light rays in the camera optical lens 10, 20, 30 when the first prism PL is inclined to make the system with better imaging quality and lower sensitivity.

In cases where the above conditionals are satisfied, by setting up a plurality of lenses (L1, L2, L3, L4, L5, L6) with the shape and Abbe number vd1 of the first optical member L1 and specifying a range of a ratio of the radius of curvature R2 of the image surface of the first optical member L1 to the radius of curvature R3 of the objective surface of the second lens L2, it is possible to realize that the camera optical lens lenses 10, 20, 30 of a large-aperture periscope-style design, which enables excellent optical performance and is particularly suitable for smart terminals such as smartphones, tablet computers, smartwatches and notebook computers.

Based on the above relationship expressions and the functions that can be realized, the characteristics of each lens are further refined as follows.

In an embodiment, an on-axis thickness of the second lens L2 is d5, a focal length of the second lens L2 is f2, and the following relationship expression is satisfied:

$$-12.00 \leq f2/d5 \leq -10.00. \tag{3}$$

The relationship expression (3) specifies a range of a ratio of the focal length f2 of the second lens L2 to its on-axis thickness d5. With the limit of the relationship expression, it is conducive to buffering changes in the angle of incidence of light rays from a large angle of view to enable the light rays to propagate smoothly through the lens set, while maintaining the strength of the refractive force of the fifth lens L5 to improve chromatic aberration and enhance the imaging quality.

In an embodiment, an on-axis thickness of the fourth lens L4 is d9, an on-axis spacing between the fourth lens L4 and the fifth lens L5 is d10, and the following relationship expression is satisfied:

$$0.95 \leq d9/d10 \leq 3.10. \tag{4}$$

The relationship expression (4) specifies a range of a ratio of the on-axis thickness d9 of the fourth lens L4 to an on-axis thickness d10 between the fourth lens L4 and the fifth lens L5. In this way, the on-axis thickness and air spacing of each lens can be reasonably distributed, which is conducive to reducing the sensitivity of the camera optical lens 10, 20, 30, and improving the production yield. Besides, it also makes the structure of the optical system more compact, thereby realizing the ultra-thin design of the camera optical lens 10, 20, 30.

In an embodiment, a radius of curvature of an objective surface of the fourth lens L4 is R7, a radius of curvature of an image surface of the fourth lens L4 is R8, and the following relationship expression is satisfied:

$$-5.70 \leq R7/R8 \leq -1.60. \tag{5}$$

The relationship expression (5) specifies a setting range of the radius of curvature of the side surface of the fourth lens L4. Within the range of the relationship expression, the field curvature of the camera optical lens 10, 20, 30 can be better balanced, and the field curvature of the center field of view can be made to deviate by less than 0.01 mm, thereby improving the imaging effect.

In an embodiment, a focal length of the camera optical lens 10, 20, 30 is f, an image height IH of the camera optical lens 10, 20, 30, and the following relationship expression is satisfied:

$$f/IH \leq 4.50. \tag{6}$$

The relationship expression (6) defines a range of a ratio of the focal length f of the camera optical lens 10, 20, 30 to its maximum image height IH. Within the range of the relationship expression, it is indicated that the camera optical lens 10, 20, 30 satisfy a telephoto design.

In an embodiment, a focal length of the first optical member is f1, and the focal length of the camera optical lens is f. A radius of curvature of the objective surface of the first optical member is R1, and an on-axis thickness from the objective surface of the first optical member L1 to the reflective surface is d1. A total track length of the camera optical lens 10, 20, 30 is TTL, and the following relationship expression is satisfied:

$$1.83 \leq f1/f \leq 8.63; \tag{7}$$

$$-22.32 \leq (R1 + R2)/(R1 - R2) \leq -2.86; \tag{8}$$

$$0.08 \leq d1/TTL \leq 0.27. \tag{9}$$

The relationship expression (7) specifies a range of a ratio of the focal length f1 of the first optical member L1 to the focal length f of the camera optical lens 10, 20, 30. within the range, it is conducive to improving the optical performance of the camera optical lens 10, 20, 30. In an embodiment, 2.93≤f1/f≤6.91. The relationship expression (8) specifies the shape of the objective surface and the shape of the image surface of the first optical member L1, which is conducive to improving the imaging quality of the camera optical lens 10, 20, 30. In an embodiment, −13.95≤(R1+R2)/(R1−R2)≤−3.57. The relationship expression (9) specifies a range of a ratio of the on-axis thickness d1 between the objective surface of the first optical member L1 and the reflective surface to the total track length TTL of the camera optical lens 10, 20, 30. Within the range, it is conducive to realizing an ultra-thin design of the camera optical lens 10, 20, 30. In an embodiment, 0.13≤d1/TTL≤0.22.

The second lens L2 has a negative refractive force, its objective surface is convex at a proximal-axis position and its image surface is concave at a proximal-axis position. The objective surface and image surface of the second lens L2 may also be provided with other concave and convex distributions.

A radius of curvature of the image surface of the second lens L2 is R4. A focal length of the second lens L2 is f2. An on-axis thickness of the second lens L2 is d5. The total track length of the camera optical lens lenses 10, 20, and 30 is TTL, and the following relationship expression are satisfied:

$$-1.83 \leq (R3 + R4)/(R3 - R4) \leq 6.10; \tag{10}$$

$$-1.65 \leq f2/f \leq -0.49; \tag{11}$$

$$0.02 \leq d5/TTL \leq 0.07. \tag{12}$$

The relationship expression (10) specifies the shape of the second lens L2. Within the range, it is conducive to compensating for on-axis chromatic aberration with the development of the camera optical lens towards ultra-thin wide angle. In an embodiment, 2.94≤(R3+R4)/(R3−R4)≤4.88. The relationship expression (11) specifies a range of a ratio of the focal length f2 of the second lens L2 to the focal lengths of the camera optical lens 10, 20, 30, which contributes to improving the optical performance of the camera optical lens 10, 20, 30, In an embodiment, −1.03≤f2/f≤−0.61. The relationship expression (12) specifies a range of a ratio of the on-axis thickness d5 of the second lens L2 to the total track length TTL of the camera optical lens 10, 20, 30. Within the range defined by the relationship expression, it is conducive to realizing an ultra-thin design. In an embodiment, 0.03≤d5/TTL≤0.06.

The third lens L3 has a positive refractive force, its objective surface is convex at a proximal-axis position and its image surface is convex at a proximal-axis position. The objective surface and the image surface of the third lens L3 may also be provided with other concave and convex distributions.

In an embodiment, a radius of curvature of the objective surface of the third lens L3 is R5, and a radius of curvature of the image surface of the third lens L3 is R6. A focal length of the third lens L3 is f3, and an on-axis thickness of the third lens L3 is d7. The total track length of the camera optical lens 10, 20, 30 is TTL, and the following relationship expressions are satisfied:

$$1.51 \leq (R5 + R6)/(R5 - R6) \leq -0.49; \tag{13}$$

$$0.15 \leq f3/f \leq 0.50; \tag{14}$$

$$0.04 \leq d7/TTL \leq 0.14. \tag{15}$$

The relationship expression (13) specifies the shape of the third lens L3. Within the limited range, it is conducive to compensating for on-axis chromatic aberration with the development of the camera optical lens towards ultra-thin wide angle. In an embodiment, −0.94≤(R5+R6)/(R5−R6)≤−0.61. The relationship expression (14) specifies a range of a radio of the focal length f3 of the third lens L3 to the focal length f3 of the focal length f of the camera optical lens 10, 20, 30. Within the range, it is conducive to reducing the aberration and enhancing the imaging quality of the camera optical lens 10, 20, 30, In an embodiment, 0.24≤f3/f≤0.40. The relationship expression (15) specifies a range of a ratio of the on-axis thickness d7 of the third lens L3 to the total track length TTL of the camera optical lens 10, 20, 30. Within the range of the relationship expression, it is conducive to realizing an ultra-thin design of the camera optical lens 10, 20, 30.

The fourth lens L4 has a negative refractive force, its objective surface is concave at a proximal-axis position and its image surface is concave at a proximal-axis position. The objective surface and the image surface of the fourth lens L4 may also be provided with other concave and convex distributions.

In an embodiment, a radius of curvature of the objective surface of the fourth lens L4 is R7, and a radius of curvature of the image surface of the fourth lens L4 is R8. A focal length of the fourth lens L4 is f4, and an on-axis thickness of the fourth lens L4 is d9. The total track length of the camera optical lens 10 is TTL, and the following relationship expressions are satisfied:

$$-1.02 \le f4/f \le -0.24; \tag{16}$$

$$0.02 \le d9/TTL \le 0.08. \tag{17}$$

The relationship expression (16) defines a range of a ratio of the focal length f4 of the fourth lens L4 to the focal length f of the camera optical lens 10, 20, 30, which is conducive to improving optical system performance, In an embodiment, $-0.64 \le f4/f \le -0.30$. The relationship expression (17) defines a range of a ratio of the on-axis thickness d9 of the fourth lens L4 to the total track length TTL in a range of ratios. Within the parameter range, it is conducive to realizing an ultra-thin design of the camera optical lens 10, 20, 30. In an embodiment, $0.03 \le d9/TTL \le 0.06$.

The fifth lens L5 has a positive refractive force, its objective surface is convex at a proximal-axis position and its image surface is concave at a proximal-axis position. The objective surface and the image surface of the fifth lens L5 may also be provided with other concave and convex distributions.

In an embodiment, a radius of curvature of the objective surface of the fifth lens L5 is R9, and a radius of curvature of the image surface of the fifth lens L5 is R10. A focal length of the fifth lens L5 is f5, and an on-axis thickness of the fifth lens is d11. The total track length of the camera optical lens lenses 10, 20, and 30 is TTL:

$$-5.45 \le (r9 + r10)/(r9 - r10) \le -1.30; \tag{18}$$

$$0.32 \le f5/f \le 1.16; \tag{19}$$

$$0.02 \le d11/TTL \le 0.10. \tag{20}$$

The relationship expression (18) specifies the shape of the fifth lens L5. Within the range specified by the relationship expression, it is conducive to correcting problems such as aberration of the off-axis drawing angle. In an embodiment, $-3.41 \le (R9+R10)/(R9-R10) \le -1.63$. The relationship expression (19) specifies a range of a ratio of the focal length f5 of the fifth lens L5 to the focal length f of the camera optical lens lenses 10, 20 and 30. Within the range of the relationship expression, it is conducive to reducing aberration and improving image quality. In an embodiment, $0.51 \le f5/f \le 0.93$. The relationship expression (20) specifies a range of a ratio of the on-axis thickness d11 of the fifth lens L5 to the total track length TTL of the camera optical lens 10, 20, 30. Within the range, it is conducive to realizing an ultra-thin design of the camera optical lens 10, 20, 30. In an embodiment, $0.04 \le d11/TTL \le 0.08$.

The sixth lens L6 has a positive refractive force, its objective surface is convex at a proximal-axis position and its image surface is concave at a proximal-axis position. The sixth lens L6 may also have a negative refractive force, and the objective surface and the image surface of the sixth lens L6 may be set to other concave and convex distributions.

In an embodiment, a radius of curvature of the objective surface of the sixth lens L6 is R11, and a radius of curvature of the image surface of the sixth lens L6 is R12. A focal length of the sixth lens L6 is f6, and an on-axis thickness of the sixth lens L6 is d13. An total track length of the camera optical lens lenses 10, 20, 30 is TTL:

$$-208.82 \le (R11 + R12)/(R11 - R12) \le 17.08; \tag{21}$$

$$-8.06 \le f6/f \le 6.55; \tag{22}$$

$$0.01 \le d13/TTL \le 0.04. \tag{23}$$

The relationship expression (21) specifies the shape of the sixth lens L6. Within the range, the radius of curvature of the objective surface and the radius of curvature of the image side of the sixth lens L6 have a large selection space, which helps to arbitrarily set the parameters according to the needs of actual production and processing. In an embodiment, $-130.51 \le (R11+R12)/(R11-R12) \le 13.67$. The relationship expression (22) specifies a range of a ratio of the focal length f6 of the sixth lens L6 to the focal length f of the camera optical lens 10, 20, 30. Within the range, the sixth lens L6 has an appropriate negative refractive force, which is conducive to reducing systematic aberration, and is conducive to the development of the lens towards ultra-thinness and wide-angle. In an embodiment, $-5.04 \le f6/f \le 5.64$. The relationship expression (23) specifies a range of a ratio of the focal length f6 of the sixth lens L6 and the focal length f of the camera optical lens 10, 20, 30, which is conducive to realizing an ultra-thin design of the camera optical lens 10, 20, 30. In an embodiment, $0.02 \le d13/TTL \le 0.04$.

In an embodiment, an aperture number of the camera optical lens 10, 20, 30 is FNO, and the following relationship expression is satisfied:

$$FNO \le 2.2. \tag{24}$$

In this way, it is conducive to realizing a large aperture design of the camera optical lens 10, 20, 30.

In the present application, the material of the first optical member L1 is glass, and the material of the second lens L2, the third lens L3, the fourth lens L4, the fifth lens L5, and the sixth lens L6 are resin. In other feasible embodiments, the first optical member L1 and the respective lenses may also be provided in other materials.

In the present application, an optical element such as an optical filter GF is provided between the sixth lens L6 and the imaging surface Si. The optical filter GF may be a glass cover plate or an optical filter (filter). In other embodiments, the optical filter GF may also be provided at other positions.

The camera optical lens 10 of the present application can improve the performance of aspherical prisms after tilting, and can realize a large-aperture periscope-style design with excellent optical performance.

The camera optical lens of the present application will be described in the following with examples. The symbols recorded in each embodiment are shown below. The units of focal length, the on-axis distance, the center radius of curvature, the on-axis thickness, the position of the inflection point, and the position of the stationary point are mm.

TTL: total track length (on-axis distance from the objective surface of the first lens L1 to the image surface Si) in mm;

Aperture value FNO: a ratio of the effective focal length of the camera optical lens to the diameter of the incident pupil.

In an embodiment, the lens may also be provided with a reflex point and/or a standing point on the objective surface and/or the image surface to fulfill the need for high-quality imaging.

The technical solution of the present application is next specified in three embodiments, and a comparative embodiment is also provided as a reference illustration, in which the technical effect of the present application cannot be realized beyond the range of the above relationship expressions.

First Embodiment

FIG. 1 is a structural schematic diagram of the camera optical lens 10 according to the first embodiment. The following shows design data of the camera optical lens 10 according to the first embodiment of the present application.

Table 1 lists the radius of curvature R, the on-axis thickness of the lens, the on-axis distance d between the lenses, the refractive index nd, and the Abbe number vd of the objective surface as well as the image surface of the first lens L1 to the sixth lens L6 constituting the camera optical lens 10 in the first embodiment of the present application. Table 2 illustrates the cone coefficient k and the aspheric coefficient of the camera optical lens 10 as described. It should be noted that in this embodiment, the units of distance, radius, and thickness are millimeters (mm).

TABLE 1

|  | R | d | nd |  | vd |  |
|---|---|---|---|---|---|---|
| ST | ∞ | d0 = −15.272 | / | / | / | / |
| R1 | 16.500 | d1 = 4.900 | nd1 | 1.5806 | vd1 | 60.08 |
| RF | ∞ | d2 = 4.320 |  |  |  |  |
| RG | ∞ | d3 = 0.480 |  |  |  |  |
| R2 | 23.319 | d4 = 2.976 |  |  |  |  |
| R3 | 4.195 | d5 = 1.129 | nd2 | 1.6501 | vd2 | 21.44 |
| R4 | 2.538 | d6 = 0.444 |  |  |  |  |
| R5 | 3.277 | d7 = 2.433 | nd3 | 1.5444 | vd3 | 55.82 |
| R6 | −23.351 | d8 = 0.089 |  |  |  |  |
| R7 | −15.000 | d9 = 1.400 | nd4 | 1.5876 | vd4 | 29.04 |
| R8 | 4.744 | d10 = 0.458 |  |  |  |  |
| R9 | 4.292 | d11 = 1.696 | nd5 | 1.6700 | vd5 | 19.39 |
| R10 | 9.263 | d12 = 0.577 |  |  |  |  |

TABLE 1-continued

|  | R | d | nd |  | vd |  |
|---|---|---|---|---|---|---|
| R11 | 3.671 | d13 = 0.800 | nd6 | 1.5444 | vd6 | 55.82 |
| R12 | 3.742 | d14 = 5.143 |  |  |  |  |
| R13 | ∞ | d15 = 0.210 | ndg | 1.5168 | vg | 64.17 |
| R14 | ∞ | d16 = 3.464 |  |  |  |  |

The meanings of the symbols in the above table are as follows.

R: radius of curvature of the optical surface;

ST: aperture;

R1: object surface of the first optical member L1;

RF: reflective surface of the first optical member L1;

RG: gluing surface of the first optical member L1;

R2: image surface of the first optical member L1;

R3: objective surface of the second lens L2;

R4: image surface of the second lens L2;

R5: objective surface of the third lens L3;

R6: image surface of the third lens L3;

R7: objective surface of the fourth lens L4;

R8: image surface of the fourth lens L4;

R9: objective surface of the fifth lens L5;

R10: image surface of the fifth lens L5;

R11: objective surface of the sixth lens L6;

R12: image surface of the sixth lens L6;

R13: objective surface of the optical filter GF;

R14: image surface of the optical filter GF;

d: on-axis thickness of the lens or on-axis distance between adjacent lenses;

d0: on-axis distance from the aperture ST to the objective surface of the first lens L1;

d1: on-axis thickness from the objective surface of the first lens L1 to the reflecting surface of the aspherical prism;

d2: on-axis thickness from the reflective surface of the first optical member to the gluing surface;

d3: on-axis thickness from the gluing surface to the image surface of the first optical member (on-axis thickness of the first lens SL);

d4: on-axis distance from the image surface of the first optical member L1 to the objective surface of the second lens L2;

d5: on-axis thickness of the second lens L2;

d6: on-axis distance from the image surface of the second lens L2 to the objective surface of the third lens L3;

d7: on-axis thickness of the third lens L3;

d8: on-axis distance from the objective surface of the third lens L3 to the image surface of the fourth lens L4;

d9: on-axis thickness of the fourth lens L4;

d10: on-axis distance from the image surface of the fourth lens L4 to the objective surface of the fifth lens L5;

d11: on-axis thickness of the fifth lens L5;

d12: on-axis distance from the image surface of the fifth lens L5 to the objective surface of the sixth lens L6;

d13: on-axis thickness of the sixth lens L6;

d14: on-axis distance from the image surface of the sixth lens L6 to the objective surface of the optical filter GF;

d15: on-axis thickness of the optical filter GF;

d16: on-axis distance from the image surface of the optical filter GF to the image surface Si;

nd: refractive index of the line d;

nd1: refractive index of the first optical member L1;

nd2: refractive index of the second lens L2;

nd3: refractive index of the third lens L3;

nd4: refractive index of the fourth lens L4;

nd5: refractive index of the fifth lens L5;

nd6: refractive index of the sixth lens L6;

ndg: refractive index of the optical filter GF;

vd: Abbe number;

vd1: Abbe number of the first optical member L1;

vd2: Abbe number of the second lens L2;

vd3: Abbe number of the third lens L3;

vd4: Abbe number of the fourth lens L4;

vd5: Abbe number of the fifth lens L5;

vd6: Abbe number of the sixth lens L6;

vg: Abbe number of the optical filter GF;

TABLE 2

| | Cone Coefficient | Aspheric Coefficient | | | | |
|---|---|---|---|---|---|---|
| | k | A4 | A6 | A8 | A10 | A12 |
| R1 | 7.2150E+00 | −1.8180E−04 | −9.9082E−07 | −1.3684E−06 | 3.3704E−07 | −5.0325E−08 |
| R2 | 3.1309E+00 | 2.0263E−05 | 9.5155E−06 | −9.6716E−07 | 3.6744E−08 | / |
| R3 | −4.7069E+00 | −8.9075E−04 | 5.5889E−04 | −1.0250E−04 | 2.4735E−05 | −4.6246E−06 |
| R4 | −4.9577E−01 | 1.6873E−02 | −6.6454E−04 | −5.1538E−05 | 9.2978E−05 | −2.7792E−05 |
| R5 | −2.0418E+00 | 5.1200E−04 | −9.2988E−05 | −2.1160E−04 | 1.1493E−04 | −2.6433E−05 |
| R6 | 4.2765E+01 | 4.6348E−03 | −4.9705E−03 | 2.1440E−03 | −4.8264E−04 | 6.5295E−05 |
| R7 | 1.0177E+01 | 8.1448E−03 | −7.2078E−03 | 3.1013E−03 | −8.5296E−04 | 1.5380E−04 |
| R8 | −1.1966E+01 | 1.0544E−02 | −4.3091E−03 | 1.3277E−03 | −4.7320E−04 | 1.0127E−04 |
| R9 | −3.3159E+00 | 1.2557E−02 | −2.7137E−03 | 5.4771E−04 | −1.6896E−04 | 3.1882E−05 |
| R10 | 1.1194E+01 | 2.2450E−02 | −6.1362E−03 | 1.6066E−03 | −3.8723E−04 | 7.9845E−05 |
| R11 | −1.0609E+01 | 2.5183E−02 | 2.2737E−03 | −2.5384E−03 | 8.1583E−04 | −1.5805E−04 |
| R12 | 9.1817E−03 | 3.6965E−02 | −2.9831E−03 | −4.5125E−04 | 2.7871E−04 | −6.2387E−05 |

| | Cone Coefficient | | | | | |
|---|---|---|---|---|---|---|
| | k | A14 | A16 | A18 | A20 | / |
| R1 | 7.2150E+00 | 4.4226E−09 | −2.2738E−10 | 6.3137E−12 | −7.3229E−14 | / |
| R2 | 3.1309E+00 | / | / | / | / | / |
| R3 | −4.7069E+00 | 5.4957E−07 | −3.8330E−08 | 1.4606E−09 | −2.4530E−11 | / |
| R4 | −4.9577E−01 | 4.1479E−06 | −3.3714E−07 | 1.4293E−08 | −2.4573E−10 | / |
| R5 | −2.0418E+00 | 3.2308E−06 | −2.1692E−07 | 7.3725E−09 | −9.1683E−11 | / |
| R6 | 4.2765E+01 | −5.6309E−06 | 3.0881E−07 | −9.7052E−09 | 1.2487E−10 | / |
| R7 | 1.0177E+01 | −1.8311E−05 | 1.3918E−06 | −6.0939E−08 | 1.1622E−09 | / |
| R8 | −1.1966E+01 | −1.2994E−05 | 9.6682E−07 | −2.6992E−08 | −8.3072E−10 | / |
| R9 | −3.3159E+00 | −3.7925E−06 | 3.2956E−07 | −1.6727E−08 | 1.6895E−10 | / |
| R10 | 1.1194E+01 | −1.3029E−05 | 1.3132E−06 | −4.8156E−08 | −8.7865E−10 | / |
| R11 | −1.0609E+01 | 2.0090E−05 | −1.9169E−06 | 1.5399E−07 | −7.2139E−09 | / |
| R12 | 9.1817E−03 | 8.0334E−06 | −5.9533E−07 | 2.2560E−08 | −3.1203E−10 | / |

It should be noted that the aspherical surfaces of the respective lenses in this embodiment use the aspherical surfaces shown in Equation (25) below. However, the specific form of Equation (25) below is only an example, and, in fact, is not limited to the polynomial form of the aspherical surfaces expressed in Equation (25).

$$z = (cr^2)/\{1 + [1 − (k + 1)(c^2r^2)]\}^{1/2}\} + A4r^4 + A6r^6 + \quad (25)$$
$$A8r^8 + A10r^{10} + A12r^{12} + A14r^{14} + A16r^{16} + A18r^{18} + A20r^{20}$$

k is a cone coefficient, A4, A6, A8, A10, A12, A14, A16, A18, A20 are aspherical coefficients; c is a curvature at the center of the optical surface; r is a perpendicular distance between a point on the aspherical curve and the optical axis, and z is the depth of the asphere (the perpendicular distance between a point on the aspherical surface at a distance of r from the optical axis and the tangent plane tangent to the apex of the aspherical surface on the optical axis).

Figure 2:
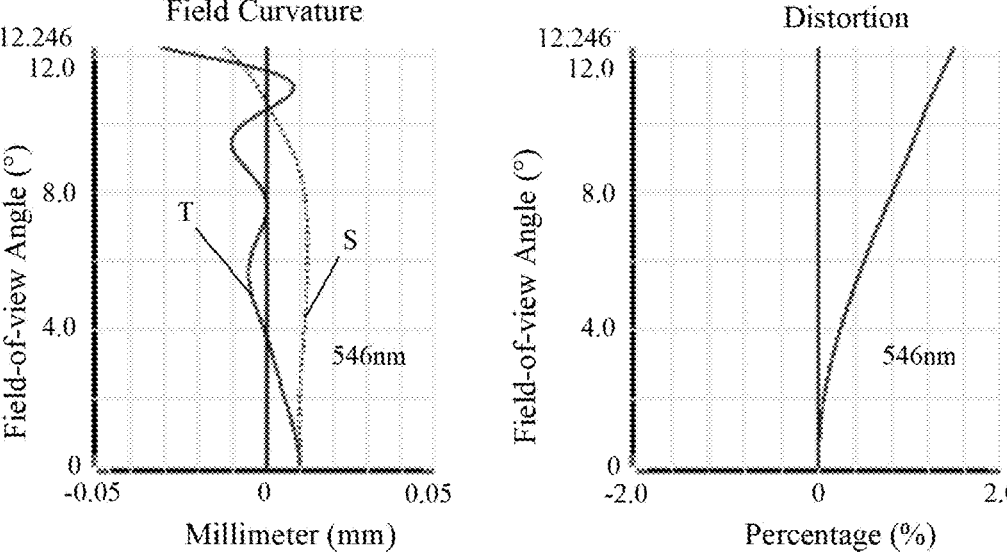
FIG. 2 is a schematic diagram of the field curvature and distortion of the camera optical lens shown in FIG. 1.
Figures 3, 4:
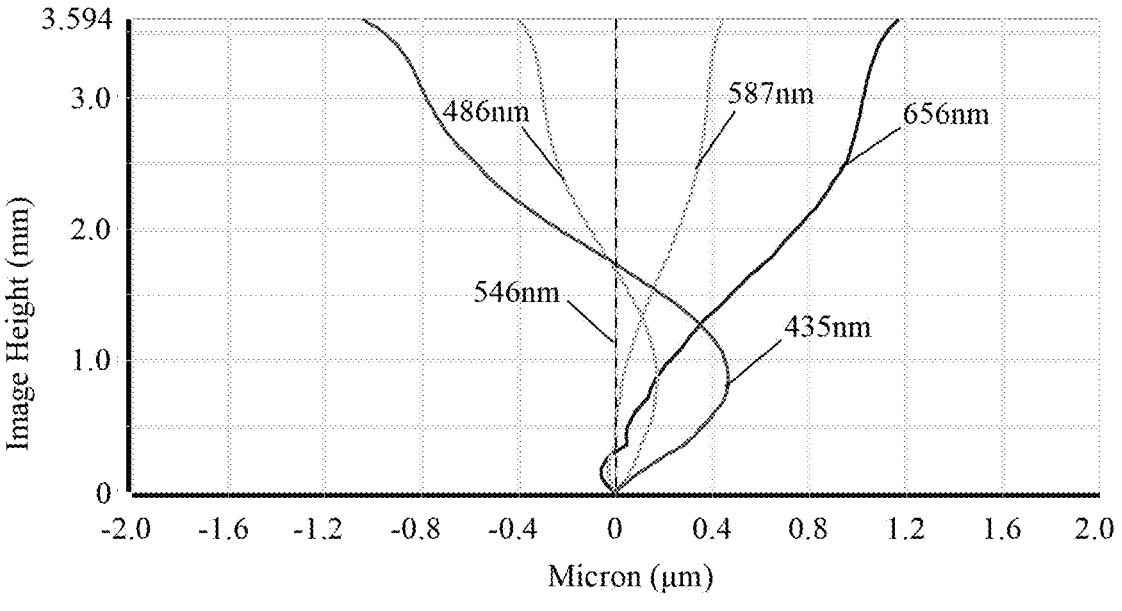
FIG. 3 is a schematic diagram of the magnification chromatic aberration of the camera optical lens shown in FIG. 1.
FIG. 4 is a schematic diagram of the axial aberration of the camera optical lens shown in FIG. 1.

FIG. 2 illustrates a schematic diagram of the image dispersion field curvature and distortion of light with a wavelength of 546 nm after passing through the camera optical lens 10 of the first embodiment. FIG. 3 illustrates a schematic diagram of the magnification chromatic aberration with wavelengths of 435 nm, 486 nm, 546 nm, 587 nm, and 656 nm, respectively, after passing through the camera optical lens 10 of the first embodiment. FIG. 4 illustrates a schematic diagram of the magnification chromatic aberration of wavelengths of 435 nm, 486 nm 546 nm, 587 nm, 656 nm after passing through the camera optical lens 10 of the first embodiment.

In this embodiment, the camera optical lens 10 has an Entrance Pupil Diameter (ENPD) of 8.224 mm, a full field-of-view image height (IH) of 3.594 mm, and a field of view (FOV) of 24.49°. The camera optical lens 10 can improve the optical performance of the first optical element L1 even when tilted, enabling image stabilization and large-aperture periscope-style design, ensuring excellent optical performance. Its axial and off-axis chromatic aberrations are adequately corrected, and it exhibits outstanding optical characteristics.

Second Embodiment

Figure 5:
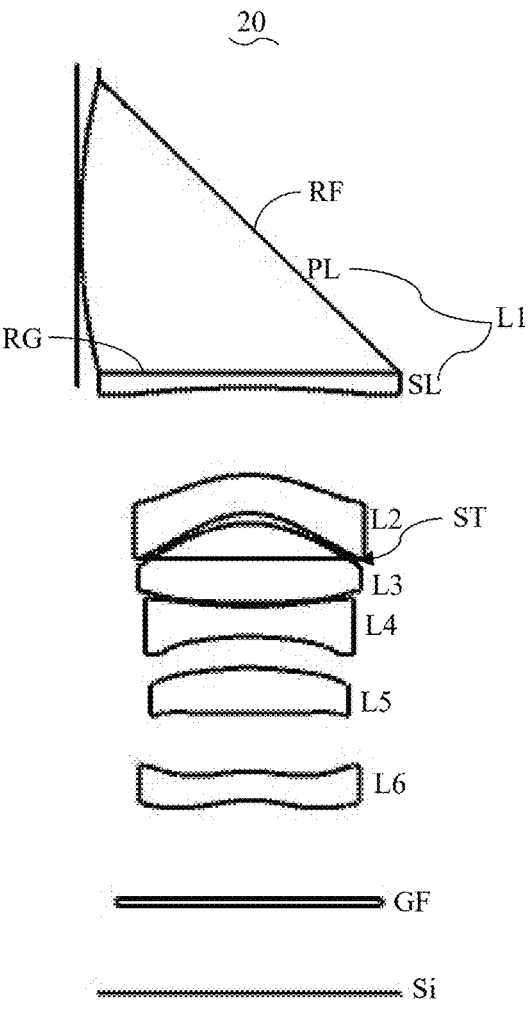
FIG. 5 is a structural schematic diagram of the camera optical lens according to the second embodiment of the present application.

FIG. 5 is a structural schematic diagram of the camera optical lens 20 according to the second embodiment, and the meaning of the symbols of the second embodiment is the same as that of the first embodiment.

Tables 3 and 4 show design data of the camera optical lens 20 of the second embodiment of the present application.

TABLE 3

| | R | d | | nd | | vd |
|---|---|---|---|---|---|---|
| ST | ∞ | d0 = −14.166 | / | / | / | / |
| R1 | 17.486 | d1 = 4.700 | nd1 | 1.5523 | vd1 | 63.46 |
| RF | ∞ | d2 = 4.200 | | | | |
| RG | ∞ | d3 = 0.400 | | | | |
| R2 | 28.137 | d4 = 2.486 | | | | |
| R3 | 3.810 | d5 = 1.091 | nd2 | 1.5848 | vd2 | 28.20 |
| R4 | 2.255 | d6 = 0.291 | | | | |
| R5 | 3.236 | d7 = 2.267 | nd3 | 1.5444 | vd3 | 55.82 |
| R6 | −21.167 | d8 = 0.090 | | | | |
| R7 | −12.144 | d9 = 0.864 | nd4 | 1.5848 | vd4 | 28.20 |
| R8 | 7.388 | d10 = 0.891 | | | | |
| R9 | 6.392 | d11 = 1.271 | nd5 | 1.6700 | vd5 | 19.39 |
| R10 | 19.822 | d12 = 1.675 | | | | |
| R11 | 4.070 | d13 = 0.820 | nd6 | 1.5346 | vd6 | 55.69 |
| R12 | 3.413 | d14 = 2.791 | | | | |
| R13 | ∞ | d15 = 0.210 | ndg | 1.5168 | vg | 64.17 |
| R14 | ∞ | d16 = 2.487 | | | | |

TABLE 4

| | Cone Coefficient | Aspheric Coefficient | | | | |
|---|---|---|---|---|---|---|
| | k | A4 | A6 | A8 | A10 | A12 |
| R1 | 1.1617E+01 | −2.3527E−04 | −5.8251E−06 | −9.7223E−07 | 2.7036E−07 | −4.5739E−08 |
| R2 | / | | / | | / | |
| R3 | −4.1970E+00 | −1.9876E−03 | 6.9439E−04 | −1.1500E−04 | 2.4565E−05 | −4.4624E−06 |
| R4 | −5.8678E−01 | 1.6521E−02 | −7.3533E−04 | −5.2265E−06 | 9.4562E−05 | −2.8170E−05 |
| R5 | −3.1150E+00 | −3.6499E−03 | 1.3623E−04 | −1.7206E−04 | 1.1339E−04 | −2.6648E−05 |
| R6 | 2.6986E+01 | 5.1073E−03 | −4.9515E−03 | 2.1446E−03 | −4.8232E−04 | 6.5395E−05 |
| R7 | −1.5322E+00 | 7.6351E−03 | −7.2859E−03 | 3.1129E−03 | −8.5138E−04 | 1.5374E−04 |
| R8 | −3.0388E+01 | 5.4091E−03 | −4.0013E−03 | 1.3602E−03 | −4.7127E−04 | 1.0112E−04 |
| R9 | −1.5058E+01 | 1.0274E−02 | −2.8730E−03 | 5.9019E−04 | −1.7125E−04 | 3.2470E−05 |
| R10 | 4.9098E+01 | 1.8857E−02 | −5.1029E−03 | 1.3643E−03 | −3.8228E−04 | 8.3048E−05 |
| R11 | −1.3284E+01 | 1.4453E−02 | 4.6462E−03 | −2.7405E−03 | 7.8081E−04 | −1.5043E−04 |
| R12 | −3.9451E−01 | 3.7201E−02 | −4.0087E−03 | 7.2724E−05 | 1.0510E−04 | −2.8077E−05 |

| | Cone Coefficient | | | | | |
|---|---|---|---|---|---|---|
| | k | A14 | A16 | A18 | A20 | / |
| R1 | 1.1617E+01 | 4.2999E−09 | −2.3539E−10 | 6.9601E−12 | −8.7420E−14 | / |
| R2 | / | | / | | / | / |
| R3 | −4.1970E+00 | 5.5143E−07 | −3.9888E−08 | 1.4864E−09 | −2.1599E−11 | / |
| R4 | −5.8678E−01 | 4.1208E−06 | −3.3590E−07 | 1.4407E−08 | −2.4174E−10 | / |
| R5 | −3.1150E+00 | 3.2209E−06 | −2.1652E−07 | 7.4702E−09 | −9.2670E−11 | / |
| R6 | 2.6986E+01 | −5.6348E−06 | 3.0722E−07 | −9.9880E−09 | 1.5599E−10 | / |
| R7 | −1.5322E+00 | −1.8320E−05 | 1.3901E−06 | −6.1027E−08 | 1.1786E−09 | / |
| R8 | −3.0388E+01 | −1.2932E−05 | 9.4069E−07 | −2.8497E−08 | −2.6440E−10 | / |
| R9 | −1.5058E+01 | −3.7453E−06 | 2.5928E−07 | −9.0230E−09 | 6.5803E−11 | / |
| R10 | 4.9098E+01 | −1.2978E−05 | 1.3339E−06 | −7.9490E−08 | 2.1042E−09 | / |
| R11 | −1.3284E+01 | 2.0058E−05 | −1.7749E−06 | 9.3579E−08 | −2.2236E−09 | / |
| R12 | −3.9451E−01 | 4.0406E−06 | −3.5532E−07 | 1.7910E−08 | −3.9772E−10 | / |

Figure 6:
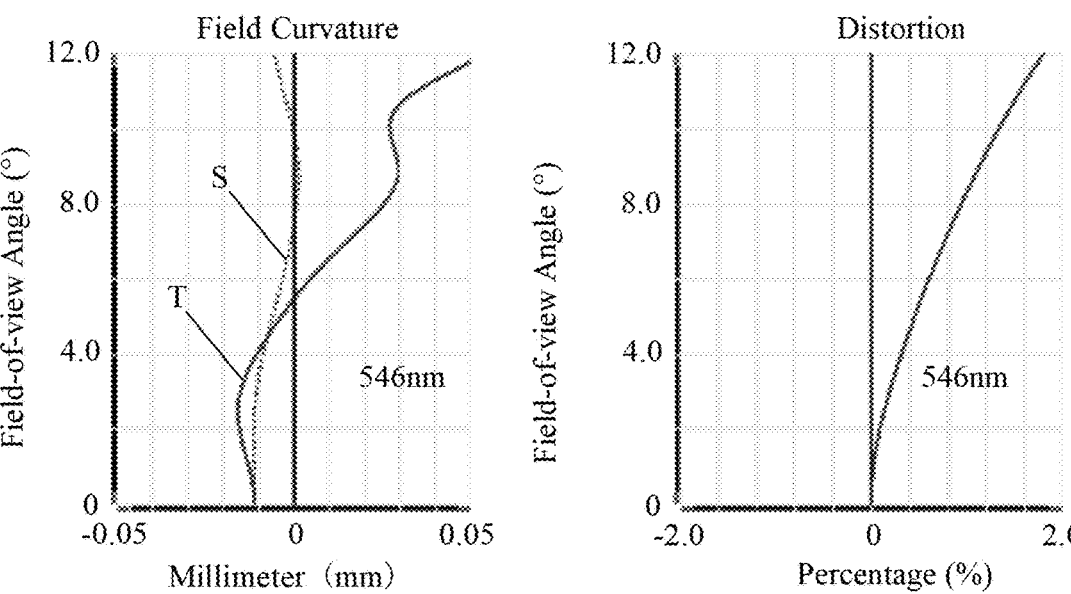
FIG. 6 is a schematic diagram of the field curvature and distortion of the camera optical lens shown in FIG. 5.
Figure 7:
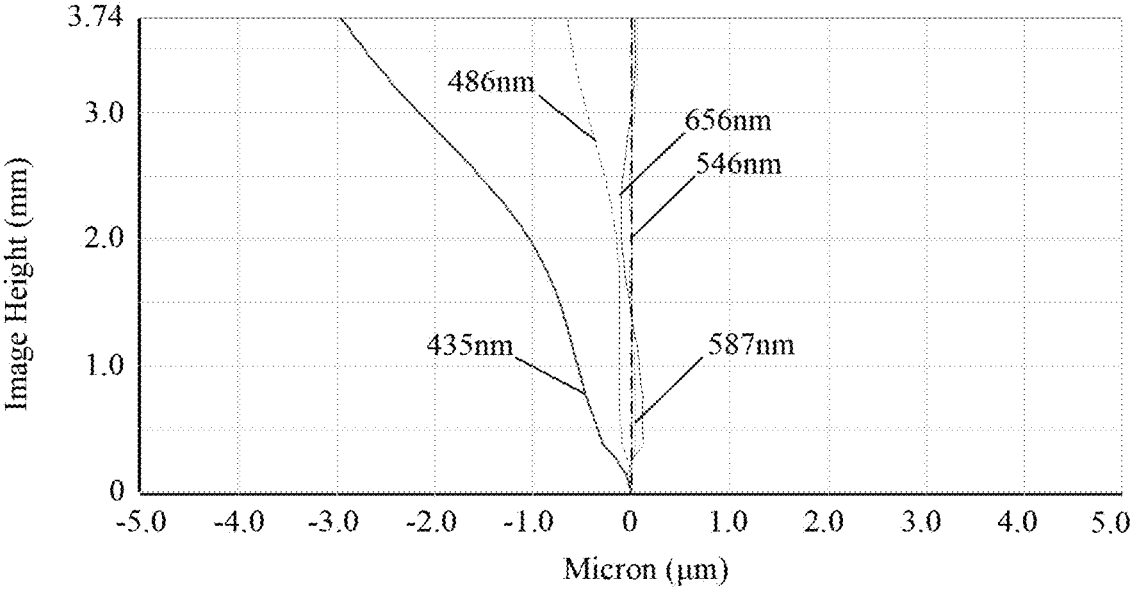
FIG. 7 is a schematic diagram of the magnification chromatic aberration of the camera optical lens shown in FIG. 5.
Figure 8:
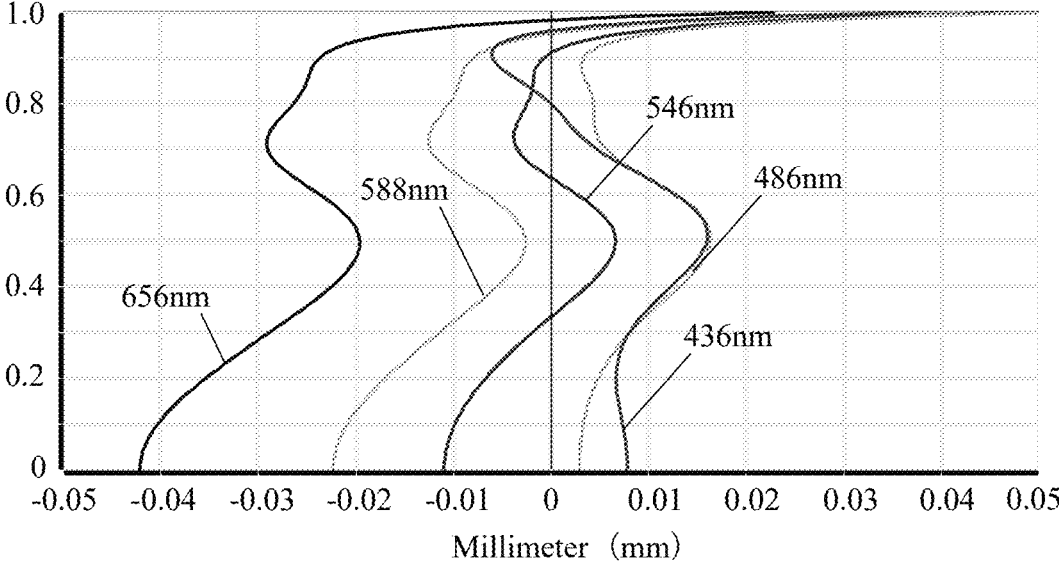
FIG. 8 is a schematic diagram of the axial aberration of the camera optical lens shown in FIG. 5.

FIG. 6 illustrates a schematic diagram of the image dispersion field curvature and distortion of light with a wavelength of 546 nm after passing through the camera optical lens 20 of the second embodiment. FIG. 7 illustrates a schematic diagram of the magnification chromatic aberration of light with wavelengths of 435 nm, 486 nm, 546 nm, 587 nm, and 656 nm, respectively, after passing through the camera optical lens 20 of the second embodiment. FIG. 8 illustrates a schematic diagram of the axial aberration of light with wavelengths of 435 nm, 486 nm, 546 nm, 587 nm, 656 nm after passing through the camera optical lens 20 of the second embodiment.

In this embodiment, the camera optical lens 20 has an Entrance Pupil Diameter (ENPD) of 8.7292 mm, a full field-of-view image height (IH) of 3.728 mm, and a diagonal field of view of 24.07°. The camera optical lens 20 can improve the optical performance of the first optical element L1 even when tilted, enabling image stabilization and large-aperture periscope-style design, ensuring excellent optical performance. Its axial and off-axis chromatic aberrations are adequately corrected, and it exhibits outstanding optical characteristics.

Third Embodiment

Figure 9:
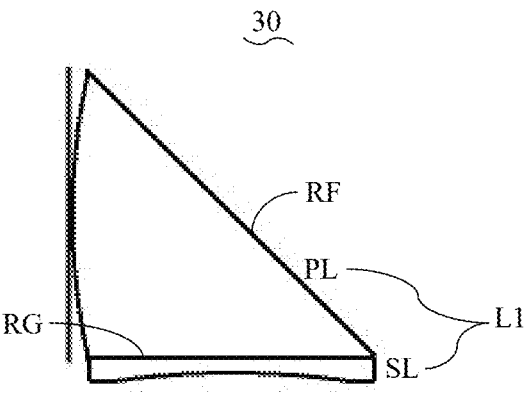
FIG. 9 is a structural schematic diagram of the camera optical lens according to the third embodiment of the present application.
Figure 9:
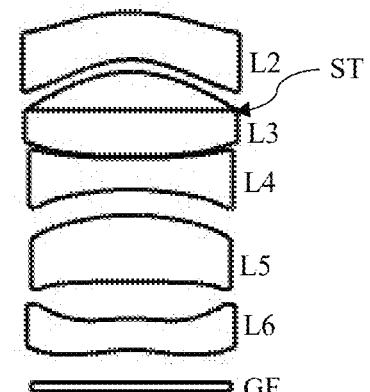

FIG. 9 is a structural schematic diagram of the camera optical lens 30 according the third embodiment. The third embodiment is basically the same as the first embodiment, the symbols have the same meaning as that of the first embodiment, and only the differences are listed below.

Tables 5 and 6 show the design data of the camera optical lens 30 of the third embodiment of the present application.

TABLE 5

| | R | d | | nd | | vd | |
|---|---|---|---|---|---|---|---|
| ST | ∞ | d0 = | −13.102 | / | / | / | / |
| R1 | 17.000 | d1 = | 4.020 | nd1 | 1.5806 | vd1 | 60.08 |
| RF | ∞ | d2 = | 3.620 | | | | |
| RF | ∞ | d3 = | 0.400 | | | | |
| R2 | 20.346 | d4 = | 2.566 | | | | |
| R3 | 4.436 | d5 = | 1.201 | nd2 | 1.6501 | vd2 | 21.44 |
| R4 | 2.536 | d6 = | 0.317 | | | | |
| R5 | 3.071 | d7 = | 2.144 | nd3 | 1.5444 | vd3 | 55.82 |
| R6 | −19.486 | d8 = | 0.052 | | | | |
| R7 | −31.102 | d9 = | 0.789 | nd4 | 1.5876 | vd4 | 29.04 |
| R8 | 5.507 | d10 = | 0.655 | | | | |
| R9 | 4.862 | d11 = | 1.686 | nd5 | 1.6700 | vd5 | 19.39 |
| R10 | 11.881 | d12 = | 0.952 | | | | |
| R11 | 5.139 | d13 = | 0.800 | nd6 | 1.5444 | vd6 | 55.82 |
| R12 | 3.844 | d14 = | 0.835 | | | | |
| R13 | ∞ | d15 = | 0.210 | ndg | 1.5168 | vg | 64.17 |
| R14 | ∞ | d16 = | 4.129 | | | | |

TABLE 6

| | Cone Coefficient | Aspheric Coefficient | | | | |
|---|---|---|---|---|---|---|
| | k | A4 | A6 | A8 | A10 | A12 |
| R1 | 1.2511E+01 | −2.9053E−04 | −4.2079E−06 | −1.8388E−06 | 3.5738E−07 | −4.9283E−08 |
| R2 | / | / | / | / | / | / |
| R3 | −5.0368E+00 | −2.4958E−04 | 6.1293E−04 | −1.0159E−04 | 2.5128E−05 | −4.7125E−06 |
| R4 | −5.1736E−01 | 1.8297E−02 | −4.0918E−04 | −1.2279E−04 | 9.9255E−05 | −2.6993E−05 |
| R5 | −2.1447E+00 | 1.5078E−03 | −1.1373E−04 | −2.3922E−04 | 1.1444E−04 | −2.5679E−05 |
| R6 | 2.2811E+01 | 7.4687E−03 | −4.6669E−03 | 2.1266E−03 | −4.9032E−04 | 6.5165E−05 |
| R7 | 6.2546E+01 | 1.2559E−02 | −7.1033E−03 | 3.0720E−03 | −8.4932E−04 | 1.5340E−04 |
| R8 | −1.6623E+01 | 9.2141E−03 | −4.4521E−03 | 1.3181E−03 | −4.7626E−04 | 1.0474E−04 |
| R9 | −3.4225E+00 | 1.2942E−02 | −3.6138E−03 | 4.9325E−04 | −1.4158E−04 | 3.1095E−05 |
| R10 | −1.9468E+01 | 1.9227E−02 | −7.1222E−03 | 1.7283E−03 | −4.5941E−04 | 9.2034E−05 |
| R11 | −1.9370E+01 | 4.1978E−02 | −2.3084E−03 | −1.9190E−03 | 7.8166E−04 | −1.5892E−04 |
| R12 | 5.4741E−01 | 5.1890E−02 | −8.9993E−03 | 1.2465E−03 | −5.4900E−05 | −1.4893E−05 |

| | Cone Coefficient | | | | | |
|---|---|---|---|---|---|---|
| | k | A14 | A16 | A18 | A20 | / |
| R1 | 1.2511E+01 | 3.9885E−09 | −1.9639E−10 | 5.4027E−12 | −6.8697E−14 | / |
| R2 | / | / | / | / | / | / |
| R3 | −5.0368E+00 | 5.6513E−07 | −3.7192E−08 | 8.2350E−10 | 1.8755E−11 | / |
| R4 | −5.1736E−01 | 4.0200E−06 | −3.5658E−07 | 1.7579E−08 | −3.4988E−10 | / |
| R5 | −2.1447E+00 | 3.2307E−06 | −2.2571E−07 | 7.1475E−09 | −2.5304E−11 | / |
| R6 | 2.2811E+01 | −5.5064E−06 | 3.1519E−07 | −1.2349E−08 | 2.6762E−10 | / |
| R7 | 6.2546E+01 | −1.8471E−05 | 1.3911E−06 | −5.6172E−08 | 8.2506E−10 | / |
| R8 | −1.6623E+01 | −1.2840E−05 | 9.1896E−07 | −4.6647E−08 | 1.5808E−09 | / |
| R9 | −3.4225E+00 | −3.8381E−06 | 3.5622E−07 | −3.1045E−08 | 1.4684E−09 | / |
| R10 | −1.9468E+01 | −1.2989E−05 | 1.0257E−06 | 5.3270E−09 | −5.6164E−09 | / |
| R11 | −1.9370E+01 | 2.0198E−05 | −1.7293E−06 | 1.2155E−07 | −6.5991E−09 | / |
| R12 | 5.4741E−01 | 3.6376E−06 | −3.5459E−07 | 1.4960E−08 | −1.1978E−10 | / |

Figure 10:
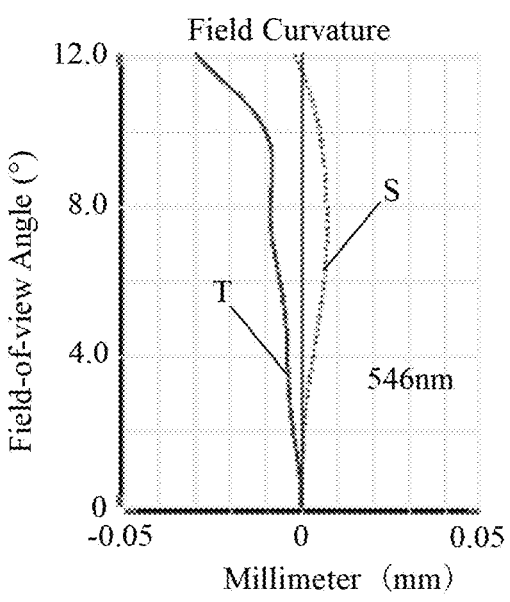
FIG. 10 is a schematic diagram of the field curvature and distortion of the camera optical lens shown in FIG. 9.
Figure 10:
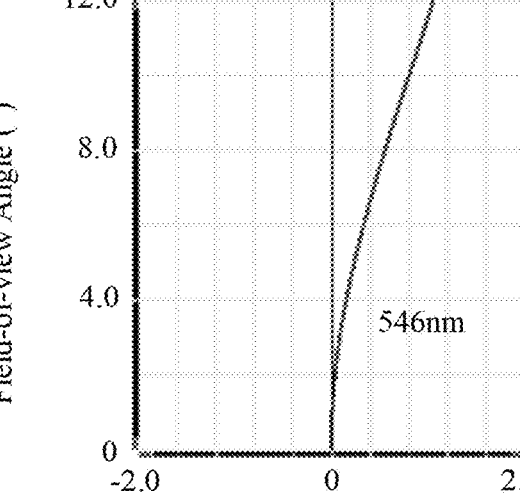
Figure 11:
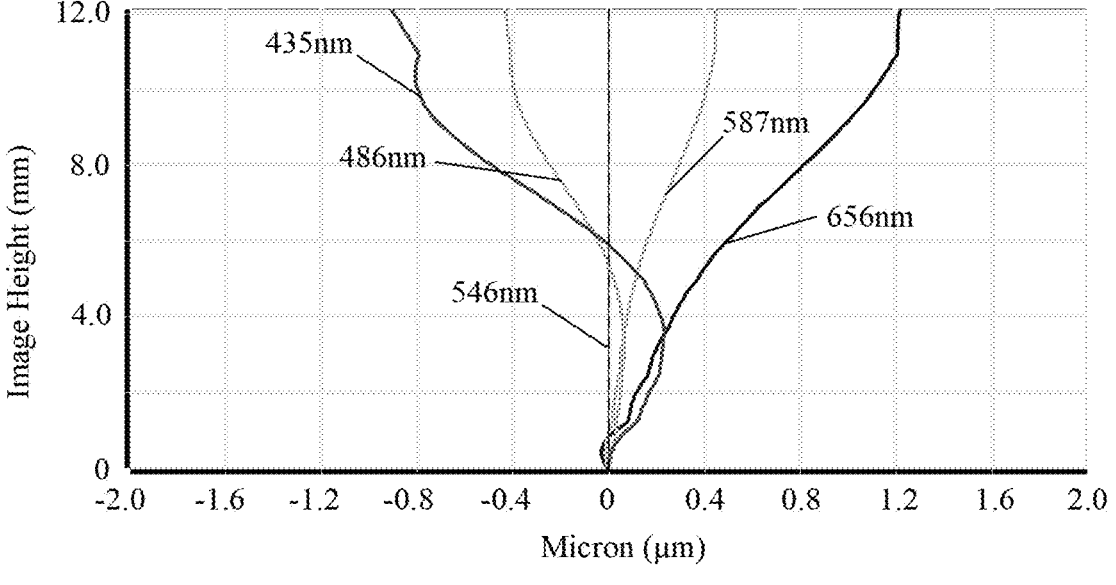
FIG. 11 is a schematic diagram of the magnification chromatic aberration of the camera optical lens shown in FIG. 9.
Figure 12:
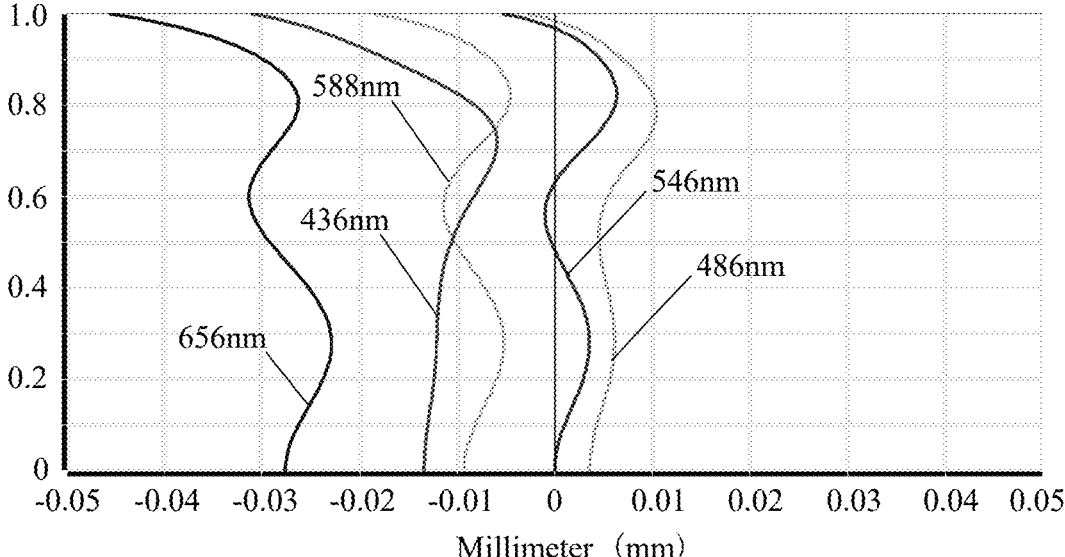
FIG. 12 is a schematic diagram of the axial aberration of the camera optical lens shown in FIG. 9.

FIG. 10 illustrates a schematic diagram of the image dispersion field curvature and distortion of light with a wavelength of 546 nm after passing through the camera optical lens 30 of the third embodiment. FIG. 11 illustrates a schematic diagram of the magnification chromatic aberration of light with wavelengths of 435 nm, 486 nm, 546 nm, 587 nm, and 656 nm, respectively, after passing through the camera optical lens 30 of the third embodiment. FIG. 12 illustrates a schematic diagram of the axial aberration of light with wavelengths of 435 nm, 486 nm, 546 nm, 587 nm, 656 nm after passing through the camera optical lens 30 of the third embodiment.

In this embodiment, the camera optical lens 30 has an Entrance Pupil Diameter (ENPD) of 6.99 mm, a full field-of-view image height (IH) of 3.353 mm, and a diagonal field of view of 24.23°. The camera optical lens 20 can improve the optical performance of the first optical element L1 even when tilted, enabling image stabilization and large-aperture periscope-style design, ensuring excellent optical performance. Its axial and off-axis chromatic aberrations are adequately corrected, and it exhibits outstanding optical characteristics.

Table 7, which appears later, shows the values corresponding to various values in each of the first, second, and third embodiments and the parameters that have been specified in the relationship expression.

TABLE 7

| Parameters and relationship expressions | First Embodiment | Second Embodiment | Third Embodiment |
|---|---|---|---|
| vd1 | 60.080 | 63.460 | 60.080 |
| R2/R3 | 5.559 | 7.385 | 4.587 |
| f2/d5 | −11.873 | −11.613 | −10.078 |
| d9/d10 | 3.057 | 0.970 | 1.205 |

TABLE 7-continued

| Parameters and relationship expressions | First Embodiment | Second Embodiment | Third Embodiment |
|---|---|---|---|
| R7/R8 | −3.162 | −1.644 | −5.648 |
| f/IH | 4.531 | 4.656 | 4.597 |
| f | 16.284 | 17.359 | 15.413 |
| f1 | 63.526 | 63.537 | 88.714 |
| f2 | −13.405 | −12.670 | −12.104 |
| f3 | 5.431 | 5.308 | 5.021 |
| f4 | −5.928 | −7.664 | −7.836 |
| f5 | 10.364 | 13.401 | 11.226 |
| f6 | 71.1 | −69.924 | −36.247 |
| FNO | 1.98 | 1.99 | 2.20 |
| TTL | 26.845 | 26.534 | 24.376 |
| IH | 3.594 | 3.728 | 3.353 |
| FOV | 24.49 | 24.07 | 24.23 |

The above embodiments of the present application provide a detailed description of the camera optical lens, and Specific examples are applied herein to illustrate the principles and embodiments of the present application. The above description of the embodiment is only used to help understand the idea of the present application, and there may be changes in the specific embodiments and scope of application. In summary, the contents of the specification should not be construed as a limitation on the present application.

What is claimed is:

1. A camera optical lens, comprising in order from an objective side to an image side:
   a first optical member having a positive refractive force;
   a second lens having a negative refractive force;
   a third lens having a positive refractive force;
   a fourth lens having a negative refractive force;
   a fifth lens having a positive refractive force; and
   a sixth lens;

wherein an objective surface of the first optical member is curved and convex at a proximal-axis position, and an image surface of the first optical member is curved and concave at a proximal-axis position; the first optical member is provided with a reflective surface between an objective surface and an image surface; a radius of curvature of the image surface of the first optical member is R2; an Abbe number of the first optical member is vd1, and a radius of curvature of an objective surface of the second lens is R3, and the following relationship expressions are satisfied:

$$vd1 \geq 60.00;$$

$$4.50 \leq R2/R3 \leq 50.00.$$

2. The camera optical lens of claim 1, wherein an on-axis thickness of the second lens is d5; a focal length of the second lens is f2, and the following relationship expression is satisfied:

$$-12.00 \leq f2/d5 \leq -10.00.$$

3. The camera optical lens of claim 1, wherein an on-axis thickness of the fourth lens is d9; an on-axis spacing between the fourth lens and the fifth lens is d10, and the following relationship expression is satisfied:

$$0.95 \leq d9/d10 \leq 3.10.$$

4. The camera optical lens of claim 1, wherein a radius of curvature of an objective surface of the fourth lens is R7; a radius of curvature of an image surface of the fourth lens is R8, and the following relationship expression is satisfied:

$$-5.70 \leq R7/R8 \leq -1.60.$$

5. The camera optical lens of claim 1, wherein a focal length of the camera optical lens is f; a maximum image height of the camera optical lens is IH, and the following relationship expression is satisfied:

$$f/IH \geq 4.50.$$

6. The camera optical lens of claim 1, wherein a focal length of the first optical member is f1; a focal length of the camera optical lens is f; a radius of curvature of the objective surface of the first optical member is R1; an on-axis thickness from the objective surface of the first optical member to the reflective surface is d1; a total track length of the camera optical lens is TTL, and the following relationship expressions are satisfied:

$$1.83 \leq f1/f \leq 8.63;$$

$$-22.32 \leq (R1 + R2)/(R1 - R2) \leq -2.86;$$

$$0.08 \leq d1/TTL \leq 0.27.$$

7. The camera optical lens of claim 1, wherein an objective surface of the second lens is convex at a proximal-axis position, and an image surface of the second lens is concave at a proximal-axis position; a radius of curvature of the image surface of the second lens is R4; a focal length of the second lens is f2; an on-axis thickness of the second lens is d5; a total track length of the camera optical lens is TTL, and the following relationship expressions are satisfied:

$$-1.83 \leq (R3 + R4)/(R3 - R4) \leq 6.10;$$

$$-1.65 \leq f2/f \leq -0.49;$$

$$0.02 \leq d5/TTL \leq 0.07.$$

8. The camera optical lens of claim 1, wherein an objective surface of the third lens is convex at a proximal-axis position, and an image surface of the third lens is convex at a proximal-axis position; a radius of curvature of the objective surface of the third lens is R5, and a radius of curvature of the image surface of the third lens is R6; a focal length of the third lens is f3; an on-axis thickness of the third lens is d7; a total track length of the camera optical lens is TTL, and the following relationship expressions are satisfied:

$$-1.51 \leq (R5 + R6)/(R5 - R6) \leq 0.49;$$

$$0.15 \leq f3/f \leq 0.50;$$

$$0.04 \leq d7/TTL \leq 0.14.$$

9. The camera optical lens of claim 1, wherein an objective surface of the fourth lens is concave at a proximal-axis position, and an image surface of the fourth lens is concave at a proximal-axis position; a focal length of the fourth lens is f4; an on-axis thickness of the fourth lens is d9; a total track length of the camera optical lens is TTL, and the following relationship expressions are satisfied:

$$-1.02 \leq f4/f \leq -0.24;$$

$$0.02 \leq d9/TTL \leq 0.08.$$

10. The camera optical lens of claim 1, wherein an objective surface of the fifth lens is convex at a proximal-axis position, and an image surface of the fifth lens is concave at a proximal-axis position; a radius of curvature of the objective surface of the fifth lens is R9, and a radius of curvature of the image surface of the fifth lens is R10; a focal length of the fifth lens is f5; an on-axis thickness of the fifth lens is d11; a total track length of the camera optical lens is TTL:

$$-5.45 \le (R9 + R10)/(R9 - R10) \le -1.30;$$

$$0.32 \le f5/f \le 1.16;$$

$$0.02 \le d11/TTL \le 0.10.$$

11. The camera optical lens of claim 1, wherein an objective surface of the sixth lens is convex at a proximal-axis position, and an image surface of the sixth lens is concave at a proximal-axis position; a radius of curvature of the objective surface of the sixth lens is R11, and a radius of curvature of the image surface of the sixth lens is R12; a focal length of the sixth lens is f6; an on-axis thickness of the sixth lens is d13; and a total track length of the camera optical lens is TTL:

$$-208.82 \le (R11 + R12)/(R11 - R12) \le 17.08;$$

$$-8.06 \le f6/f \le 6.55;$$

$$0.01 \le d13/TTL \le 0.04.$$

12. The camera optical lens of claim 1, wherein the first optical member is formed by gluing together a first prism and a first lens, and the first lens is closer to the image surface than the first prism; an objective surface of the first prism is the objective surface of the first optical member, and an image surface of the first lens is the image surface of the first optical member; a gluing surface is perpendicular to an optical axis of the camera optical lens and provided close to the image surface of the first optical member.

13. The camera optical lens of claim 1, wherein the first optical member is an integrally molded structure.

14. The camera optical lens of claim 1, wherein the first optical member is made of glass.

* * * * *